Dec. 20, 1960     J. F. PRIBONIC     2,965,200
DAMPER FOR VALVE CONTROL
Filed Sept. 21, 1956     3 Sheets-Sheet 1

INVENTOR.
John F. Pribonic
BY
HIS ATTORNEY

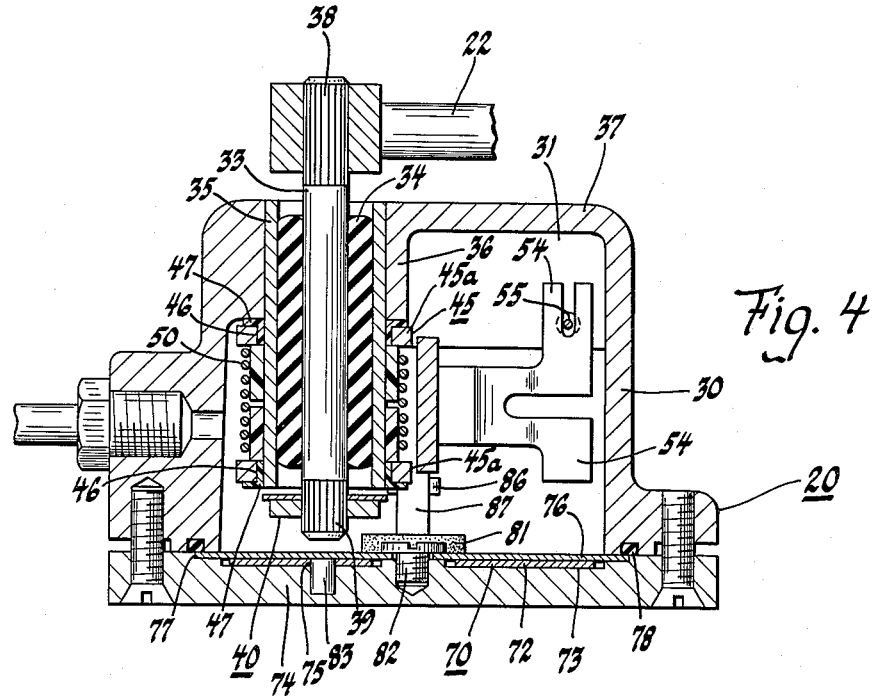
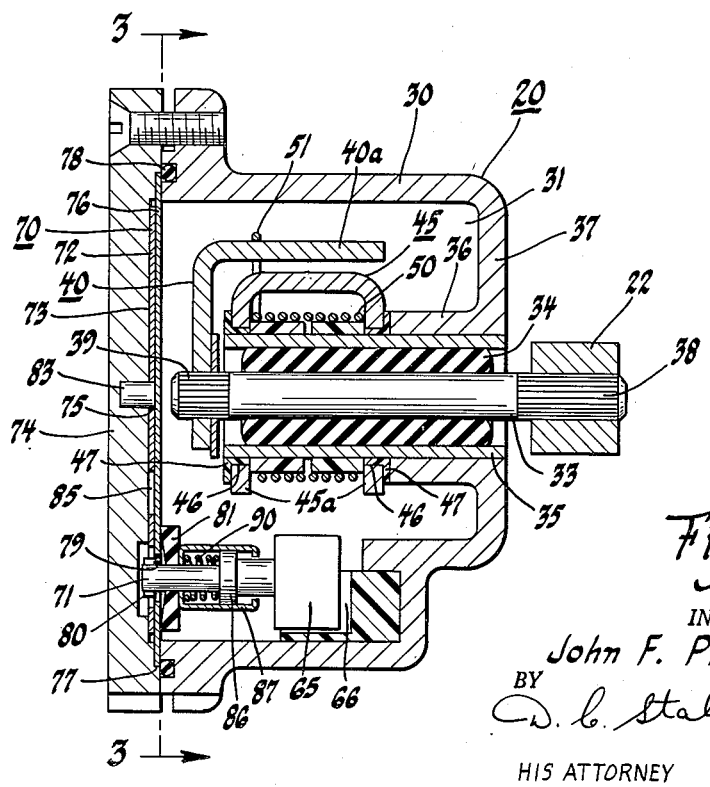

Dec. 20, 1960     J. F. PRIBONIC     2,965,200
DAMPER FOR VALVE CONTROL

Filed Sept. 21, 1956     3 Sheets-Sheet 3

INVENTOR.
John F. Pribonic
BY
HIS ATTORNEY

United States Patent Office 2,965,200
Patented Dec. 20, 1960

2,965,200

DAMPER FOR VALVE CONTROL

John F. Pribonic, Dayton, Ohio, assignor to General Motors Corporation, Detroit, Mich., a corporation of Delaware Filed Sept. 21, 1956, Ser. No. 611,320

3 Claims. (Cl. 188—90)

This invention relates to a mechanism for controlling supply and exhaust of fluid for a pressure chamber such as the fluid spring of a fluid spring suspension system.

An object of the invention is to provide an improved control device that is accurate in its regulation of the volume of air supplied to a fluid spring or that exhausted from the air spring in response to changes in attitude or clearance height between the axle and frame of a motor vehicle.

Another object of the invention is to provide an improved control mechanism in which the operation of the mechanism is damped by the use of a film of viscous liquid placed in shear.

It is another object of the invention to provide a mechanism for controlling the supply and exhaust of fluid for an air spring in which the actuating mechanism for the fluid control valves is responsive to axle movements of the vehicle, but in which the arm which actuates the valves is retarded in its movement by means of a damping device that consists of a disk carried on a wall with a film of viscous liquid at the interface of the disk and the wall, the film of viscous liquid being placed in shear by forces tending to move the disk relative to the wall and thereby obtain a damping action on the movement of the control arm that regulates the opening and closing of the fluid valves for controlling supply and exhaust of fluid for the air spring.

Another object of the invention is to provide a mechanism in accordance with the foregoing object wherein the film of viscous liquid at the interface of the damping disk and wall is isolated from the environmental atmosphere of the valve actuating mechanism to avoid adverse influence of the atmosphere on the film of viscous liquid.

Further objects and advantages of the present invention will be apparent from the following description, reference being had to the accompanying drawings wherein a preferred form of the invention is clearly shown.

In the drawings:

Figure 2 is a cross sectional view taken along line 2—2 of Figure 3 illustrating the mechanism of this invention.

Figure 4 is a cross sectional view taken along line 4—4 of Figure 3.

The control mechanism of this invention is adapted for use in a fluid suspension system for a motor vehicle to control the supply and exhaust of fluid for a fluid spring, and specifically for controlling the supply of air to an air spring and exhaust of air from an air spring.

Figure 1:
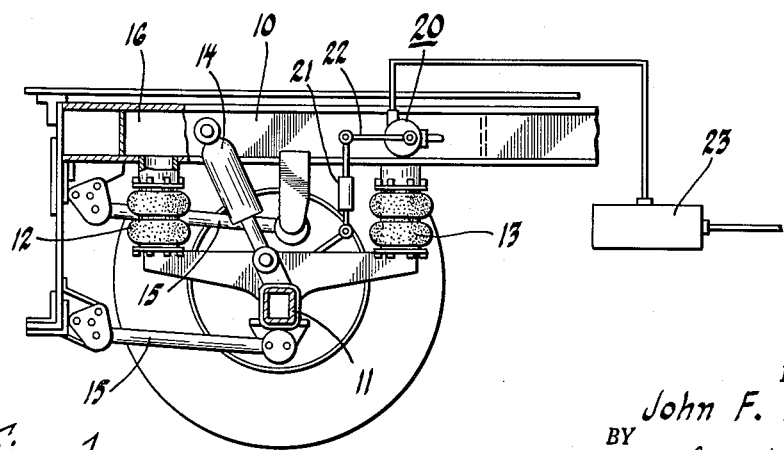
Figure 1 is a schematic view illustrating a fluid suspension system for a motor vehicle having a control mechanism incorporating features of this invention.
Figure 6:
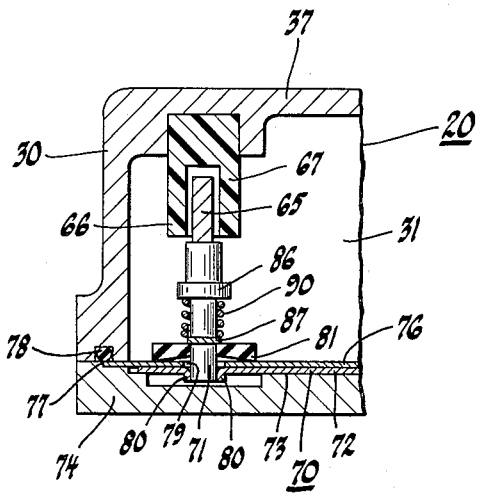
Figure 6 is a cross sectional view taken along line 6—6 of Figure 3.
Figure 5:
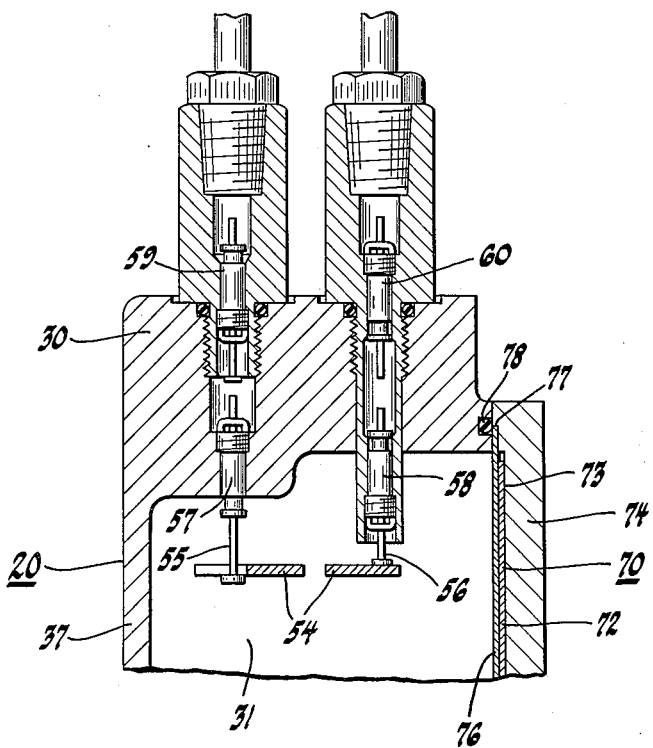
Figure 5 is a cross sectional view taken along line 5—5 of Figure 3.

In Figure 1 there is illustrated schematically a fluid suspension system for a motor vehicle wherein the chassis 10 is supported upon the axle 11 by means of a pair of air springs 12 and 13. The air springs 12 and 13 are of a bellows type adapted to contain air under pressure whereby to support the chassis 10 at a predetermined clearance height above the axle 11 under predetermined loading conditions. A conventional direct acting shock absorber 14 is placed between the chassis 10 and the axle 11. Drag links 15 connect between the axle structure and the chassis for maintaining position of the axle 11 relative to the chassis 10.

The air springs 12 and 13 connect with a common chamber 16 located in the chassis 10 of the vehicle. A control valve 20 is supported upon the chassis 10 of the vehicle and is connected with the axle 11 by a linkage 21 whereby the actuating arm 22 of the control valve operates the valve mechanism internally of the valve 20 for supply of air to the air springs 12 and 13 from a reservoir 23 and to exhaust air from the air springs.

When load in the vehicle increases, the air springs 12 and 13 are compressed thereby causing the actuating arm 22 of the valve to move upwardly and open an air inlet valve for supply of air from the reservoir 23 into the air springs 12 and 13 to reestablish the predetermined clearance height between the chassis 10 and the axle 11. When load lightens in the vehicle, from a previously loaded condition, the air springs 12 and 13 tend to expand thereby pulling the arm 22 of the control valve downwardly for opening an exhaust valve in the valve 20 and release pressure from the air springs 12 and 13 whereby to permit the chassis 10 to return to its predetermined clearance height relative to the axle 11.

Figure 3:
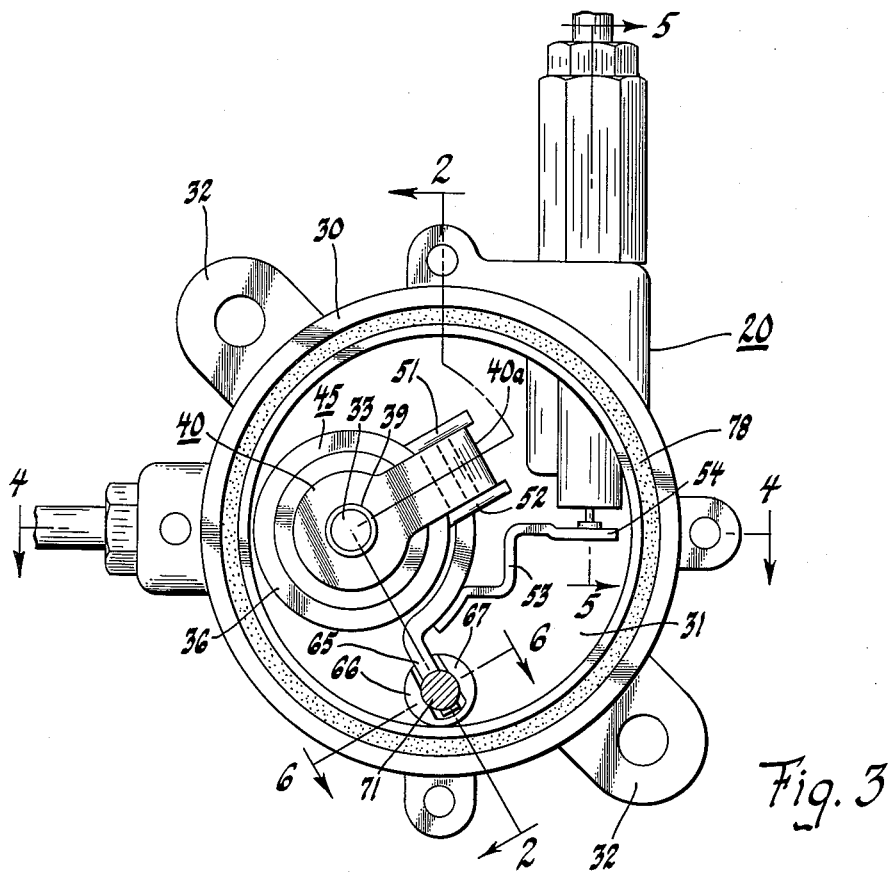
Figure 3 is a cross sectional view taken along line 3—3 of Figure 2.

The control mechanism is more particularly illustrated in Figures 2, 3 and 4 and comprises a housing 30 forming a chamber 31 that contains the operating mechanism of the control. The housing is generally cylindrical in shape, as illustrated in Fig. 3 and is provided with mounting ears 32.

The actuating lever 22 is supported upon a shaft 33 that in turn is supported in a rubber-like sleeve 34 confined within a cylindrical metal sleeve 35 whereby the three parts just mentioned form an assembly. The rubber-like sleeve 34 is held under compression between the shaft 33 and the metal sleeve 35 so that when the metal sleeve 35 is inserted in an opening provided in the boss 36 of the wall 37 of the control mechanism, the atmosphere within the chamber 31 is prevented from escaping from the chamber along the shaft 33, the sleeve 35 being a press fit in the bore of the boss 36. The outer end of the shaft 33 has a spline 38 to non-rotatably carry the lever 22. The inner end of the shaft 33 has a spline 39 that rigidly and non-rotatably supports a first lever arm 40 that has a portion 40a substantially parallel with the axis of the shaft 33. A second lever arm 45 is substantially U-shaped and has parallel walls 45a provided with aligned openings 46 to carry the sleeves 47 which support the lever arm 45 upon the sleeve 35 for free rotation of the arm on the sleeve.

A torsion spring 50 has two extending ends 51 and 52 that engage opposite sides of the extended arm portion 40a and also lay on opposite sides of the arm 45. Thus the torsion spring 50 provides means whereby the arms 40 and 45 can move together concurrently, or when the arm 45 is retarded from movement, the arm 40 can move relative to the arm 45.

The arm 45 has a first extension 53 that carries a platform 54 engaged by the ends 55 and 56 of air control valves 57 and 58. When the valve stem 56 is moved upwardly by the platform 54, air is supplied into the chamber 31, from which it is then delivered into the air springs 12 and 13 to reestablish the predetermined clearance height between the chassis 10 and the axle 11. When the platform 54 is moved downwardly to open the valve 57, air is exhausted from the chamber 31 for the same purpose. Check valves 59 and 60 are provided in series with the valves 57 and 58.

The arm 45 has a second extension 65 that operates between the limit stops 66 and 67 whereby to limit the rotation of the arm 45 on the sleeve 35 and thereby limit the maximum degree of opening of either of the valves 57 and 58.

It will be appreciated that the vertical oscillations of the axle 11 will be much greater than the small movements permitted for opening of the valves 57 and 58 by the travel of the arm 65 between the limit stops 66 and 67. Thus the arm 40 has a much greater arc of travel than the arm 45a, the ends 51 and 52 of the torsion spring 50 allowing the arm 40 to move through any desirable arc of travel effected by oscillation of the shaft 33 in response to oscillations of the axle 11.

The arm 45 that controls operation of the valves 57 and 58 is not allowed free movement with the arm 40, but rather the arm 45 is retarded or damped in its oscillation movement about the sleeve 35 to delay opening of the valves 57 and 58 and thereby cancel out the oscillatory movements of the wheel axle 11. This is occasioned by the damping device or movement retarding device 70 that is connected with the arm 45 by means of a pin 71. The delay action or movement retarding device 70 is such that the time elapse for opening either of the valves 57 or 58 from their closed position is greater than the time elapse required for the normal oscillations of the axle 11 occasioned by the wheel of the vehicle moving over rough road conditions. Thus normal rough road conditions will not effect opening of the valves 57 and 58 to alter the clearance height between the chassis 10 and the axle 11. However, if the chassis 10 of the vehicle should settle relative to the axle 11, as by loss of air from the air springs 12 and 13, the average position of the arm 45 will be changed to allow for opening of the valve 56 to reestablish the clearance height between the axle 11 and the chassis 10.

The damping or movement retarding device 70 consists of a flat metal plate 72 that is placed within a recess 73 provided in the removable cover wall 74 for the housing 30. This recess 73 is not substantially greater than the thickness of the flat metal plate 72. In fact the recess has a depth of .024" while the thickness of the flat metal plate 72 is .020". The plate 72 is in the form of a disk having an off-center opening 75 that forms a pivot axis for the disk 72. The disk 72 is covered by a cover plate 76 that extends beyond the periphery of the recess 73 so that the edge periphery 77 of the cover member 76 engages the wall of the housing 30, as illustrated in Figures 2 and 4. An O ring seal 78 engages the edge of the cover plate 76 so as to seal the recess 73 from the atmosphere of the chamber 31 and also to provide a seal for the removable cover wall 74 on the housing 30.

The pin 71 that is attached to the extension 65 of the arm 45 projects through the opening 79 in the cover plate 76 into engagement with a pair of ears 80 that are bent downwardly on the plate 72 whereby the plate 72 is connected with the arm 45. The pin 71 carries a spring 90 that retains a rubber-like seal member 81 in engagement with the cover plate 76 whereby to seal the opening 79 and thereby prevent the atmosphere within the chamber 31 from entering the recess 73 in the cover wall 74.

The cover plate 76 is retained on the cover wall 74 by means of a screw 82. The plate 72 is carried on a pivot pin 83 carried in the closure wall 74.

To provide a damping effect or movement retarding effect by the plate 72 on the arm 40, a film of viscous liquid is placed at the interface of the plate 72 and the wall 74. Openings 85 in the plate 72 provide a reservoir for the viscous liquid.

The viscosity of the liquid that is at the interface of the plate 72 and the wall 74 is such as to tend to prevent movement, or rotation, of the plate 72 about its pivot pin 83 when the pin 71 tends to rotate the plate as a result of the driving force from the arm 40. One of the viscous liquids that can be used for the film at the interface of the plate 72 and the wall 74 is a dimethyl silicone fluid of the type having the general chemical formula as shown.

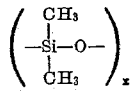

The viscosity of the dimethyl silicone fluid is on the order of from 500,000–1,000,000 centistokes and is available from the Dow-Corning Corp. under their designation "200 Fluids" or from the General Electric Co. under the name "GE Silicone Oils." These dimethyl silicone fluids have an oily or waxy feel and have a viscosity that is only very slightly affected by temperature change so that the damping effect created by the film of liquid is relatively constant, the damping effect occurring by rotation of the plate 72 relative to the wall 74 places the film of viscous liquid in shear. The shear viscosity of the dimethyl silicone fluids is at least as stable as the mechanical viscosity so that temperature conditions of the environment of the control device 20 does not substantially affect the time delay period designed into the movement retarding device 70.

It will be noted that the pivot axis 83 of the plate 72 is coaxial with the axis of the shaft 33, and that the axis of the pin 71 connecting the arm extension 65 with the plate 72 is substantially coaxial with the axis of the limit stops 66 and 67 so that movement of the plate 72 follows substantially the same arc of rotation as the arm 40. Thus there is no differential between the arc of rotation of the arm 40 and the movement retarding disk 72 that must be balanced to effect the same time lag in both directions of movement of the arm 40.

To aid in assembling the seal 81 on the pin 71, a spring retainer 87 is placed over the spring 90 with the lips hooked over the flange 86 of the pin 71 to retain the spring slightly contracted and allow the seal 81 to be inserted on the end of the pin. When the seal is in the assembled position, as illustrated in Figure 2, the spring retainer 87 merely floats on the pin 71.

While the form of embodiment of the invention as herein disclosed constitutes a preferred form, it is to be understood that other forms might be adopted as may come within the scope of the claims which follow.

What is claimed is as follows.

1. In a mechanism of the type described, a movement retarding apparatus, comprising, a wall of a housing, said wall having a recess in one face thereof not substantially greater than the thickness of a plate positioned in said recess, pivot means between said plate and said wall pivoting said plate in an off-center relation relative to the axis of the plate, a film of viscous liquid at the interface of the wall and plate, and a cover member covering said plate and extending beyond the periphery of the plate and recess into engagement with said wall whereby to isolate the said plate and the film of viscous liquid at the interface of the wall and plate from the atmosphere surrounding said wall, said cover member having an opening therein adjacent the outer peripheral edge of said plate aligned with an opening adjacent the outer peripheral edge of said plate through which a drive member can extend into engagement with said plate for driving connection therewith.

2. In a mechanism of the type described, a housing containing an oscillating member and a damping mechanism connected to the member, said damping mechanism comprising, a wall of said housing adjacent one end of said member, a thin sheet plate rotatably slidably supported on the said wall with a film of viscous liquid at the interface of the wall and plate placed in shear or relative movement between the wall and plate to retard oscillating movement of said member thereby, said plate being rotatably supported on the said wall of the housing by pivot means on an axis coinciding with the axis of said member and off center from the center of said plate, and drive means connected to the oscillating member and said plate adjacent the outer periphery of the plate to rotate said plate in the same arc of rotation as the said oscillatable member.

3. In a mechanism of the type described, an oscillating operating member, a housing containing said oscillating member and a damping mechanism connected to the member, said damping mechanism comprising, a wall of said housing adjacent one end of said member, a thin sheet plate rotatably slidably supported on the said wall with a film of viscous liquid at the interface of the wall and plate placed in shear on movement between the wall and plate to retard oscillating movement of said member thereby, said plate being rotatably supported on the said wall of the housing by pivot means on an axis coinciding with the axis of said member and eccentric relative to the center of said plate, a second thin sheet cover member on said wall covering said plate and isolating the film of liquid from the atmosphere surrounding said wall, said first-mentioned plate having an opening therein forming a reservoir for viscous liquid for supply to the interface of the wall and plate, and drive means for the said plate connected to the oscillating member and plate adjacent the outer periphery of the said plate to rotate said plate in the same arc of rotation as the said oscillatable member.

References Cited in the file of this patent
UNITED STATES PATENTS

| | | | |
|---|---|---|---|
| 945,433 | Allen | Jan. 4, | 1910 |
| 1,895,477 | McCure | Jan. 31, | 1933 |
| 2,631,690 | Dunham | Mar. 17, | 1953 |
| 2,661,913 | Heizer et al. | Dec. 8, | 1953 |
| 2,670,201 | Rossman | Feb. 23, | 1954 |
| 2,705,631 | Reichold | Apr. 5, | 1955 |
| 2,765,185 | Mott | Oct. 2, | 1956 |
| 2,775,317 | Sinisterra | Dec. 25, | 1956 |
| 2,779,442 | Bacon | Jan. 29, | 1957 |